United States Patent
Schoerg et al.

(10) Patent No.: US 8,115,440 B2
(45) Date of Patent: Feb. 14, 2012

(54) METHOD AND APPARATUS FOR POSITION-ACCURATE TRIGGERING OF A MACHINE PART

(75) Inventors: Friedrich Schoerg, Koenigsbronn (DE); Ernst Stumpp, Koenigsbronn (DE); Guenter Grupp, Boehmenkirch (DE); Otto Ruck, Ellwangen-Pfahlheim (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 442 days.

(21) Appl. No.: 12/257,422

(22) Filed: Oct. 24, 2008

(65) Prior Publication Data

US 2009/0184676 A1 Jul. 23, 2009

Related U.S. Application Data

(63) Continuation of application No. PCT/EP2007/002853, filed on Mar. 30, 2007.

(30) Foreign Application Priority Data

Apr. 27, 2006 (DE) .......................... 10 2006 020 680

(51) Int. Cl.
  *G05B 1/06* (2006.01)
  *G05B 19/29* (2006.01)
  *H02P 1/00* (2006.01)
(52) U.S. Cl. .......................... 318/640; 318/114; 318/600
(58) Field of Classification Search .................. 318/640, 318/114, 600
  See application file for complete search history.

(56) References Cited

U.S. PATENT DOCUMENTS

| | | | |
|---|---|---|---|
| 3,491,278 A | 1/1970 | Stobbe | |
| 3,842,663 A * | 10/1974 | Harting et al. | 73/593 |
| 4,081,732 A | 3/1978 | Aoyama | |
| 4,305,029 A * | 12/1981 | Takahashi | 318/603 |
| 4,594,538 A | 6/1986 | Schmitt | |
| 4,987,546 A * | 1/1991 | Blohm et al. | 700/188 |
| 5,341,157 A | 8/1994 | Campagna et al. | |
| 5,453,594 A | 9/1995 | Konecny | |

(Continued)

FOREIGN PATENT DOCUMENTS

| | | |
|---|---|---|
| DE | 1 763 565 | 9/1974 |
| DE | 31 22 621 C2 | 4/1987 |
| DE | 37 14 028 A1 | 11/1988 |

(Continued)

*Primary Examiner* — Walter Benson
*Assistant Examiner* — Gabriel Agared
(74) *Attorney, Agent, or Firm* — Harness, Dickey & Pierce, P.L.C.

(57) ABSTRACT

A machine part, such as a laser, is moved along at least one axis of movement relative to a workpiece. Position pulses are generated by means of an incremental encoder, with the number of position pulses in a position pulse train being representative of the movement position of the machine part. A trigger signal for the machine part is generated when the current number of position pulses corresponds to a predefined number of pulses. In a preferred embodiment, the current number of position pulses and the defined number of pulses are compared remote from a higher-level drive control circuit. It is particularly preferred if the current number of position pulses and the defined number of pulses are compared in a comparator which is arranged on an interface card of a computer unit, with the drive control circuit for controlling the movement of the machine part being implemented with a closed loop controller in the form of a controller program, which is cyclically executed by a central processor of the computer unit.

19 Claims, 5 Drawing Sheets

| U.S. PATENT DOCUMENTS | | | |
|---|---|---|---|
| 5,751,585 A | 5/1998 | Cutler et al. | |
| 6,316,895 B1 * | 11/2001 | Ramarathnam | 318/400.02 |
| 6,591,682 B1 * | 7/2003 | Lysen | 73/602 |
| 2005/0035101 A1 | 2/2005 | Jones et al. | |

| FOREIGN PATENT DOCUMENTS | | |
|---|---|---|
| DE | 101 49 828 A1 | 4/2003 |
| WO | WO 00/47361 | 8/2000 |
| WO | WO 2006/038017 | 4/2006 |

* cited by examiner

METHOD AND APPARATUS FOR POSITION-ACCURATE TRIGGERING OF A MACHINE PART

CROSS REFERENCES TO RELATED APPLICATIONS

This application is a continuation of international patent application PCT/EP2007/002853, filed on Mar. 30, 2007 designating the U.S., which international patent application has been published in German language as WO 2007/124828 A1 and claims priority from German patent application DE 10 2006 020 680.0, filed on Apr. 27, 2006. The entire contents of these prior applications are incorporated herein by reference.

BACKGROUND OF THE INVENTION

The present invention relates to a method and an apparatus for triggering a machine part, which can be selectively activated by a trigger signal in order process a workpiece with a high positional accuracy. Such a method and such an apparatus are particularly required for the production of liquid crystal displays (LCDs) or solar cells. However, the present invention is not restricted to these exemplary embodiments, although they are preferred applications.

One known method for position-accurate triggering of a movable machine part is described in DE 101 49 828 A1. In this case, the machine part is an engraving stylus for engraving a printing cylinder. The engraving stylus is moved relative to the printing cylinder along an axis of movement which runs parallel to the longitudinal axis of the printing cylinder. The drive for the engraving stylus is a stepping motor which produces a defined forward movement of the engraving stylus along the axis of movement in response to each pulse of a pulse train. A present axial position of the engraving stylus can therefore be determined by counting the pulses. In order to ensure high positioning accuracy of the engraving stylus, DE 101 49 828 A1 proposes a method for correcting position discrepancies. This method includes that axial measurement positions are defined on the forward movement path of the engraving stylus before the engraving process, and a measurement apparatus is used in order to determine position discrepancies at the measurement positions. The position discrepancies are provided as correction values in a correction value memory. During the engraving process, the position discrepancies of the engraving stylus are corrected by means of the values from the correction value memory.

The known method requires the correction values to be separately recorded. The position accuracy on triggering of the machine part depends on the density of the correction values. It may be disadvantageous to record a plurality of correction values due to the burden associated with this. However, it is even more problematic that the rate of movement of the machine part relative to the workpiece is limited, in the case of the known method, by the speed at which the position correction can be carried out. Since the correction values must be read from a memory and must be processed in the known method, the known method either requires rapid and expensive control computers, or the machine part can be moved forward only rather slowly. The known method is therefore not well suited for the initially mentioned preferred applications.

SUMMARY OF THE INVENTION

It is an object of the present invention to provide a method and an apparatus for triggering a machine part, which is moved relative to a workpiece, quickly and with high position accuracy. It is another object to provide such a method and apparatus, which can be implemented in a cost-effective manner.

According to a first aspect of the invention, there is provided method for position-accurate triggering of a machine part which is moved along at least one axis of movement relative to a workpiece and which is configured to process the workpiece upon the triggering, in order to process the workpiece at precisely defined processing positions which spaced one from another, the method comprising the steps of: providing an incremental encoder which generates a first pulse train having a rising number of position pulses as the machine part moves along the axis of movement, the number of position pulses representing a movement position of the machine part, defining a first number of pulses which represents a desired trigger position for the machine part, counting the position pulses during movement of the machine part in order to determine a current number of position pulses, comparing the current number of position pulses and the first number of pulses, and generating a first trigger signal in order to trigger the machine part when the current number of position pulses corresponds to the first number of pulses, wherein the machine part is moved by means of a drive control circuit having a control algorithm, wherein the drive control circuit receives the current number of position pulses in order to determine an actual position of the machine part, wherein the drive control circuit reads the current number of position pulses cyclically with a cycle time that is greater than a time interval between two adjacent position pulses, and wherein the first trigger signal for the machine part is directly generated from the pulse train, bypassing the control algorithm.

According to a second aspect, there is provided an apparatus for position-accurate triggering of a machine part which is configured to process a workpiece and which can be moved along at least one axis of movement relative to the workpiece, in order to allow position-accurate processing of the workpiece at processing positions spaced one from another, the apparatus comprising a drive control circuit having a drive for moving the machine part and having a closed loop controller including a control algorithm, an incremental encoder configured to generate a first pulse train having a rising number of position pulses as the machine part moves along the axis of movement, with the number of position pulses representing a movement position of the machine part, a memory for storing a first number of pulses which represents a desired trigger position of the machine part, a counter for counting the position pulses during movement of the machine part in order to determine a current number of position pulses, a comparator for comparing the current number of position pulses and the first number of pulses, and a signal generator for generating a first trigger signal in order to trigger the machine part when the current number of position pulses corresponds to the first number of pulses, wherein the closed loop controller operates the drive and receives the current number of position pulses as the actual position of the machine part, wherein the drive control circuit reads the current number of position pulses cyclically with a cycle time which is greater than a time interval between two adjacent position pulses, and wherein the first trigger signal for the machine part is directly generated from the pulse train, bypassing the control algorithm.

According to a third aspect, there is provided a method for position-accurate triggering of a machine part which is configured to be selectively activated by a trigger signal while it is moved along at least one axis of movement relative to a workpiece, in order to allow position-accurate processing of the workpiece at processing positions spaced one from another, the method comprising the steps of: providing an incremental encoder which generates a first pulse train having a rising number of position pulses as the machine part moves along the axis of movement, the number of position pulses representing a movement position of the machine part, defining a first number of pulses which represents a desired trigger position for the machine part, counting the position pulses during movement of the machine part in order to determine a current number of position pulses, comparing the current number of position pulses with the first number of pulses, and generating a first trigger signal in order to trigger the machine part when the current number of position pulses corresponds to the first number of pulses.

In order to trigger the machine part, the new method and apparatus evaluate a pulse train which is generated by means of an incremental encoder during movement of the machine part along the axis of movement in such a way that the number of pulses in the pulse train at one time is a measure of the distance over which the machine part has travelled with respect to a reference point. It is irrelevant whether the machine part is moved relative to a stationary workpiece or whether the workpiece is alternatively or additionally moved. For the sake of simplicity, it is assumed in the following that the machine part is moved, although this should not be understood as a restriction to such an implementation.

The incremental encoder generates a train of "position pulses", i.e. a train of pulses, the number of which is representative of the relative position of the machine part with respect to the workpiece. Since the number of position pulses is compared to a defined number of pulses, an extremely rapid and accurate decision can be made as to whether the machine part is located at a desired trigger position in order, for example, to carry out processing of the workpiece. The comparison of two numbers can be carried out with few low-cost components, largely without any complex signal preparation, and in particular very quickly.

Furthermore, the position accuracy with which the machine part is triggered in this case substantially depends on the accuracy of the incremental encoder only. Synchronization fluctuations of the drive for the machine part and/or the workpiece are completely eliminated. Furthermore, incremental encoders are easily available with a high resolution and with a very exact subdivision, because incremental encoders such as these are used in numerous machines which require position-accurate movement of a machine part, such as in the case of machine tools or coordinate measuring machines.

In preferred exemplary embodiments, a glass scale is used for the incremental encoder, the glass scale having a subdivision which is read optically, inductively or capacitively. Furthermore, preferred incremental encoders allow interpolation between subdivisions which are physically provided, therefore making it possible to achieve particularly high resolution and thus particularly exact triggering.

Since the positioning accuracy in this case depends virtually solely on the incremental encoder, a very high degree of reproducibility is also achieved, allowing very exact repeated processing of the workpiece at one and the same point.

In summary, the new method and apparatus therefore allow fast and cost-effective triggering of a machine part that can be selectively activated, and also very high positioning accuracy and reproducibility.

In a preferred refinement, the current number of position pulses and the first number of pulses are compared to one another within a time interval that is shorter than a time interval between two adjacent position pulses during movement of the machine part. The adjacent position pulses of this refinement may also be interpolated pulses between real position pulses of the glass scale in preferred variants.

This refinement allows the numbers of pulses to be compared in real time, and therefore allows particularly fast and exact triggering of the machine part.

In a further refinement, the first trigger signal is generated repeatedly as a function of the current number of position pulses until the machine part has reached a defined end position. Preferably, the end position is also defined in the form of a number of pulses, so that the end position can likewise be identified very quickly and exactly.

This refinement includes repeated triggering of the machine part as a function of the position pulses from the incremental encoder. The refinement has the advantage that the positions at which the machine part is triggered are determined very exactly and can be reproduced likewise exactly, for example for reworking or for repeated processing of the workpiece. Positional variations resulting from synchronization fluctuations between the drives are eliminated. However, synchronization fluctuations between the drives may affect the trigger frequency, i.e. the time intervals at which the machine part is triggered.

In an alternative refinement, it is therefore preferable for the first trigger signal to start a pulse generator which generates a second trigger signal having a number of successive "time pulses", with the time pulses triggering the machine part.

In this refinement, the position pulses from the incremental encoder are primarily used to define the starting position for processing the workpiece by the machine part. As soon as this starting position has been reached, which can be determined by comparison of the current number of position pulses with a suitably defined first number of pulses, a train of time pulses takes over triggering of the machine part, preferably until the machine part has reached a defined end position. In this refinement, the triggering of the machine part in the movement area between the start position and the end position no longer depends exactly on the position of the machine part but on the time which has passed since crossing the start position.

This refinement is advantageous when the machine part reacts sensitively to variations in the operating frequency or when minor variations in the relative distances between the processing positions are less serious than variations in the operating frequency of the machine part. The "time pulses" may, for example, be produced very easily and with high accuracy by a crystal-stabilized oscillator. Nevertheless, the invention profits from the advantages described in a general form above, because the start position is identified very simply, quickly and with high position accuracy.

In a further refinement of the invention, the machine part is moved at a constant speed, at least after the first trigger signal has been generated.

This refinement is advantageous in both alternatives of the invention, in order to obtain a machine part operating frequency which is as uniform as possible and intervals between the processing points on the workpiece which are as constant as possible.

In a further refinement, the constant speed is determined as a function of an operating frequency of the machine part. Preferably, the constant speed is also determined as a function of the first number of pulses.

This refinement allows rapid processing of the workpiece, without overloading the machine part which is carrying out the processing.

In a further refinement of the invention, the position pulses are counted using a digital counter, which is set to a defined start value when the first trigger signal is generated. The defined start value can be taken from a table or can be calculated from a predetermined function, with the table and/or the function preferably being stored in a computer unit, by means of which the digital counter can be set to the defined start value.

Digital counters are very simple and inexpensive components, which allow rapid evaluation of the incremental encoder. Since the digital counter is set to a defined start value whenever the first trigger signal is generated, constant or variable processing intervals can be implemented very easily and cost-effectively.

In a further refinement, the machine part carries out an action when the trigger signal is generated, with a fault signal being generated if the action does not take place or is unsuccessful. When using a laser to process a workpiece, the fault signal can, for example, be produced if the laser has not yet built up sufficient energy to carry out successful processing, at the time of the trigger signal.

This refinement is advantageous because it simplifies the identification of flaws on the processed workpiece. In this case, the flaws are identified with the same accuracy with which the workpiece is also processed.

In a further refinement, the current number of position pulses is stored in a fault memory when the fault signal occurs.

This refinement allows exact reworking of a fault point on the workpiece by moving the machine part exactly, in another run, back to the point which corresponds to the stored number of position pulses. If necessary, it is advantageous for the stored number of position pulses to take account of any possible dead time by which the fault signal is delayed when it is emitted.

In a further refinement, the machine part is moved by means of a drive control circuit, with the drive control circuit receiving the current number of position pulses in order to determine an actual position of the machine part. A preferred refinement of the new apparatus therefore comprises a drive control circuit having a drive for moving the machine part, and having a closed loop controller which operates the drive and receives the current number of position pulses for the actual position of the machine part.

In this refinement, the machine part is moved in the "traditional" manner by means of a drive control circuit. This allows accurate movement of the machine part, therefore simplifying position-accurate triggering. Since the drive control circuit according to this refinement also receives the current number of position pulses as well, the invention can be implemented, and can be integrated in proven drive control concepts, very simply and cost-effectively.

It is particularly preferable for the apparatus also to have a programmable computer unit, which comprises an interface card for connection of the incremental encoder and a central processor, wherein the closed loop controller is implemented in the form of a closed loop controller program which is run cyclically by the central processor, and wherein at least the comparator and the signal generator are arranged on the interface card.

In this refinement, the interface card generates the trigger signal for the machine part virtually directly from the position pulses which are supplied from the incremental encoder. This takes place extremely quickly and therefore allows high position resolution and accuracy. Furthermore, the position pulses present on the interface card are available for the higher-level closed loop controller, which in this case is in the form of computer software. This refinement is particularly cost-effective. By way of example, a conventional Pentium® PC is suitable for use as the computer unit, with the trigger signal being generated directly at the signal level in this case, bypassing the central processor and the data processing associated with it.

In a further refinement of the invention, the drive control circuit reads the current number of position pulses cyclically with a cycle time that is greater than a time interval between two adjacent position pulses.

This refinement allows a complex (and therefore slow) control algorithm to be used for driving the machine part and/or the workpiece. In consequence, the machine part can be moved with high basic accuracy relative to the workpiece. Furthermore, numerous environmental parameters, such as the temperature, vibrations or available drive power can be taken into account. In addition, this improves the control convenience of the apparatus. Nevertheless, this refinement profits from the general advantages of the invention as described further above, in particular the fast, exact and cost-effective triggering of the machine part.

It goes without saying that the features mentioned above and those yet to be explained below can be used not only in the respectively stated combination but also in other combinations or on their own, without departing from the scope of the present invention.

BRIEF DESCRIPTION OF THE DRAWINGS

Exemplary embodiments of the invention will be explained in more detail in the following description, and are illustrated in the drawing, in which.

DESCRIPTION OF PREFERRED EMBODIMENTS

Figure 1:
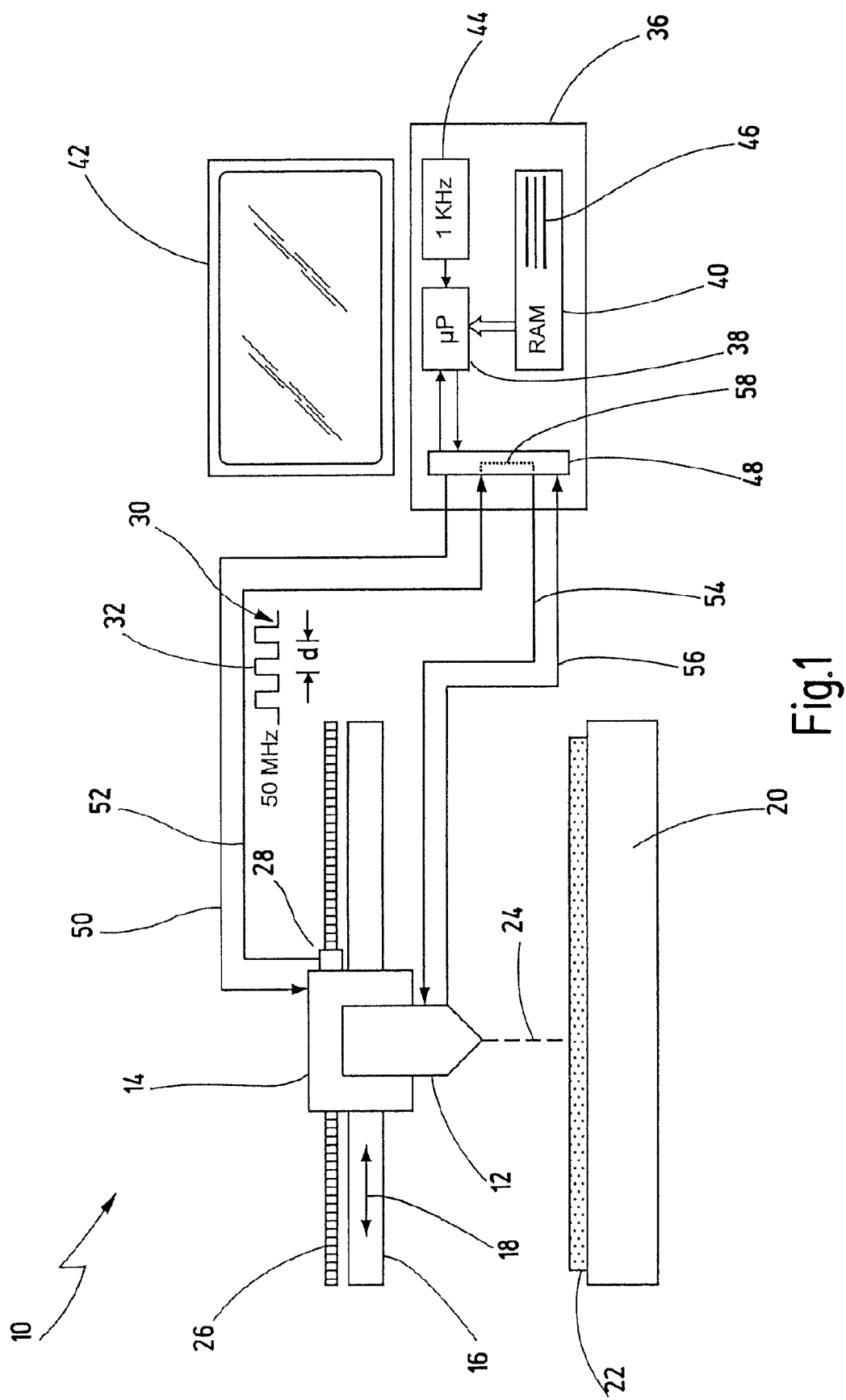
FIG. 1 shows a simplified illustration of an exemplary embodiment of the new apparatus.

In FIG. 1, an exemplary embodiment of the new apparatus is designated in its entirety with reference number 10. In this case, the apparatus 10 comprises a laser 12, which is mounted on a guide rail 16 via a drive 14. The laser 12 can be moved along the guide rail 16 by means of drive 14, as is indicated by a double-headed arrow 18, which also symbolizes the axis of movement of the laser 12.

Reference number 20 designates a machine table which in this exemplary embodiment is fixed. A workpiece 22 is arranged on the machine table 20 and is processed by means of a laser beam 24 from laser 12 at different processing positions.

In this embodiment, workpiece 22 is, for example, a glass pane for a liquid crystal screen. The glass pane must be heated at points at a plurality of processing positions by means of the laser beam 24, with the position of and the distance between the processing positions playing an important role for the quality of the processing. However, the invention is not restricted to such applications and can in general be used in all situations in which a machine part (in this case the laser 12) must be moved relative to a workpiece 22 in order to allow position-accurate processing. In this case, the expression "processing" also covers processes which do not result in any change to the workpiece 22 at the processing positions, such as making a photographic recording of the workpiece 22.

As an alternative to the exemplary embodiment described here, the machine part 12 may be fixed, while the machine table 20 is moved. Furthermore, it is possible for both the machine part 12 and the machine table 20 to be moved relative to one another.

Reference number 26 designates a glass scale which is arranged parallel to the guide rail 16. Reference number 28 designates an incremental encoder which is connected to the movable laser 12. The incremental encoder 28 uses the glass scale 26 to produce a pulse train 30 having a number of position pulses 32, with the number of position pulses 32 being representative of the position of the laser 12 along the axis of movement 18. The glass scale 26 typically has a reference mark (not illustrated here), which represents the "zero point". The position pulses 32 in the pulse train 30 indicate the position of the laser 12 relative to the reference mark.

The embodiment in FIG. 1 is illustrated in a simplified form to the extent that the incremental encoder 28 typically initially produces a sine and cosine signal. The pulse train 30 is produced from the two signals in a subsequent processing step, in which case the pulse train 30 may also include intermediate pulses, which are obtained by interpolation.

In a preferred embodiment, the pulse train 30 is at a frequency in order of magnitude of about 50 MHz, when the laser 12 is being moved at its optimum working speed along the guide rail 16. The time interval d between two pulses 32 of the pulse train is thus in the order of magnitude of 20 nanoseconds.

Reference number 36 designates a PC having a processor 38 and a memory 40. In a preferred embodiment, this is a Pentium® PC. Reference number 42 designates a monitor for the PC. In addition, the PC 36 in this embodiment has a clock generator 44 which produces a clock signal at a frequency of about 1 kHz. The clock generator 44 is used to produce an interrupt in the stated frequency, causing the processor 38 to run a program 46 which is stored in the memory 40. The program 46 contains a control algorithm, by means of which the drive 14 is operated in a manner known per se.

More precisely, the processor 38 generates a drive control signal by means of program 46 and by means of an interface card 48, the drive control signal being supplied to drive 14 via a connection 50. In turn, processor 38 receives from the interface card 48 the pulse train 30 from the incremental encoder 28 for the actual position of the drive 14 along the axis of movement 18. A corresponding connection the incremental encoder 28 and interface card 48 is designated with reference number 52.

As has already been mentioned further above, one or more analog signals can also be transmitted on connection 52, instead of the pulse train 30, and the pulse train 30 is produced by corresponding signal processing on the interface card 48 (not illustrated here). Corresponding interface cards 48 and control algorithms 46 are known to persons skilled in the art, and are therefore not be explained any further here for the sake of simplicity.

In contrast to known interface cards, interface card 48 in this case, however, is connected to the laser 12 via two further connections 54, 56. Interface card 48 transmits a trigger signal via connection 54, and this trigger signal causes the laser 12 to emit the laser beam 24. The laser 12 transmits a fault signal via connection 56 if the laser beam 24 is not produced despite the presence of the trigger signal 54 (for example because sufficient energy is not yet available to produce the laser beam 24), or when the processing of the workpiece 22 is supposedly faulty for other reasons.

According to one aspect of the present invention, the trigger signal 54 for the laser 12 is produced directly on the basis of the pulse train 30, i.e. bypassing the control algorithm 46. In the preferred exemplary embodiment, the trigger signal 54 is produced directly on the interface card 48, as is illustrated symbolically by a "link" 58.

Figure 2:
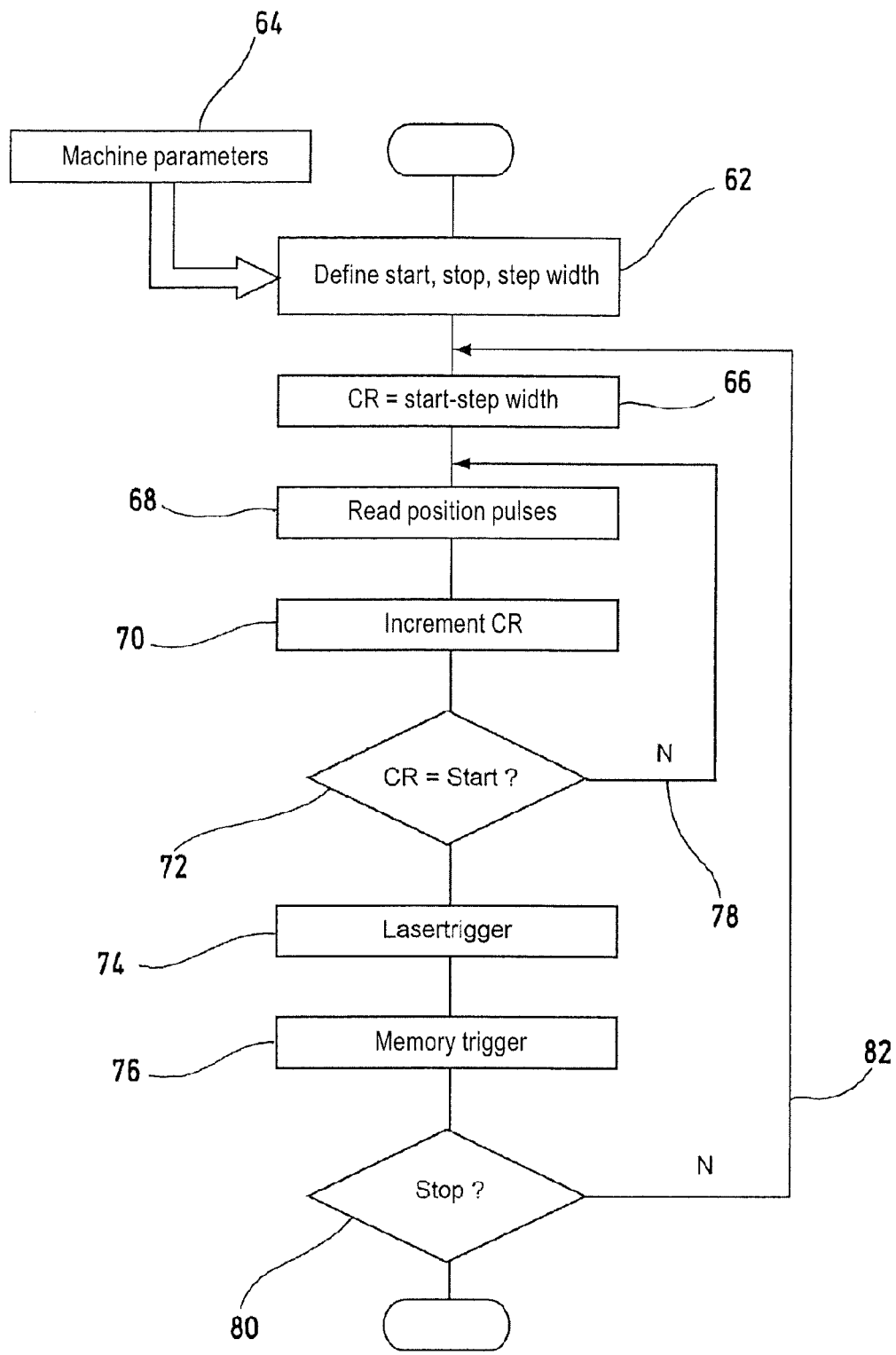
FIG. 2 shows a flowchart in order to explain a first exemplary embodiment of the invention.

FIG. 2 uses a simplified flowchart for illustrating a first exemplary embodiment of the invention. According to step 62, a start position, a stop or end position and a stepwidth are first defined for the laser processing of the workpiece 22 by defining appropriate numbers of pulses with respect to the pulse train 30, and by writing these into memory registers which are located on the interface card 48 (this will be described in more detail further below, with reference to FIG. 3).

According to step 64, when defining the numbers of pulses which correspond to the start position, the stop or end position and the stepwidth, machine parameters of the apparatus 10 are taken into account, in particular the optimum working frequency of the laser 12 and the maximum speed of movement of the drive 14. The number of pulses which represents the stepwidth for laser processing is chosen such that the movement speed of the drive 14 is less than the maximum movement speed, and such that the chosen movement speed allows the workpiece 22 to be processed at a working frequency of the laser 12 which substantially corresponds to the optimum working frequency of the laser 12.

According to step 66, a counting register CR is then set to a start value, which is obtained from the difference between the numbers of pulses for the start position and the stepwidth.

According to step 68, the drive 14 is then moved along the axis of movement 18, and the position pulses 32 in the pulse train 30 are read.

According to step 70, the counting register CR is incremented with each position pulse 32, i.e. the number of position pulses 32 is counted.

In step 72, the count in the count register CR is checked. If the count register CR contains a numerical value which is equal to the number of pulses which represents the start position, the laser 12 has been moved along the axis of movement 18 across a distance which corresponds to the chosen stepwidth. In this case, according to step 74, a trigger signal 54 is produced, and is transmitted to laser 12. Laser 12 generates the laser beam 24 as a function of the trigger signal 54.

In addition, in this case, according to step 76, a further trigger signal is produced, by means of which the current number of pulses which represents the current position of the laser 12 is stored in a memory register on the interface card 48. The processed position can be returned to exactly later on, by means of the stored number of pulses.

As long as the count in the counting register CR is less than the numerical value which corresponds to the start position, further pulses 32 in the pulse train 30 are read (loop 78).

Furthermore, a check is carried out in step 80 in order to determine whether the laser 12 has already reached the intended stop or end position. When this is the case, the method ends. Otherwise, the counting register CR is reset, according to step 66, to its start value, and a new run is carried out according to the loop 82.

In the exemplary embodiment shown in FIG. 2, the trigger signal 54 for the laser 12 is produced when the laser 12 has moved along a distance which corresponds to the selected stepwidth, with both the position of the laser 12 as well as the selected stepwidth being represented by a number of position pulses 32 in the pulse train 30. The laser 12 is triggered when the current number of position pulses is greater by a multiple of the selected stepwidth than the number of pulses which corresponds to the start position of the laser 12.

A person skilled in the art will be aware that the stepwidth may be constant or may vary over the entire distance over which the laser 12 is moved. In the last-mentioned situation, the counting register CR is set to a different start value on each run through loop 82, in which case it is sufficient to vary only the parameter for the stepwidth. In the first-mentioned situation, the counting register CR is in each case reset to the same start value in step 66.

Figure 3:
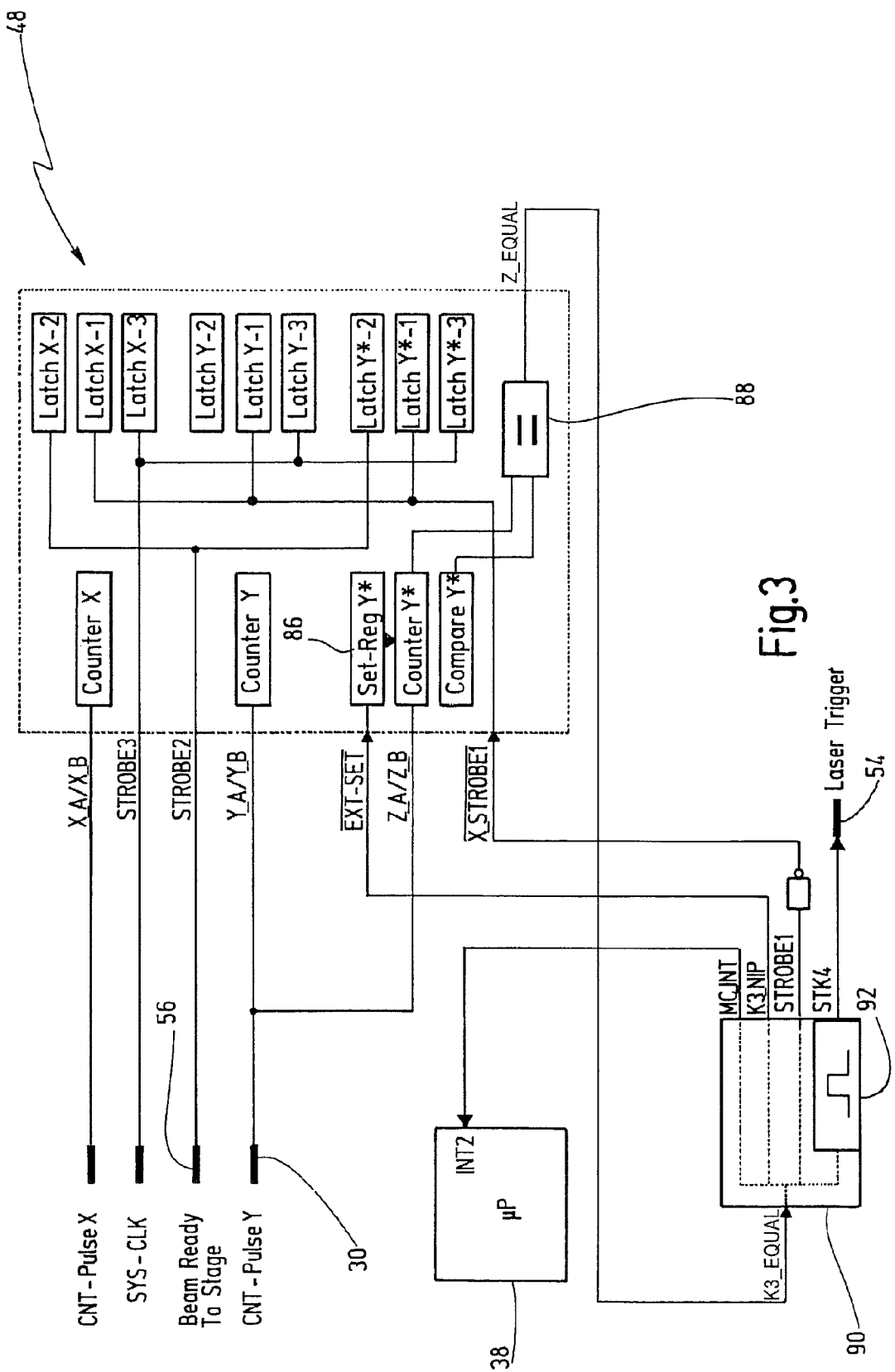
FIG. 3 shows a block diagram in order to explain the first exemplary embodiment.

FIG. 3 shows a block diagram with major functional groups which are provided on the interface card 48 in order to carry out the method shown in FIG. 2. Same reference symbols denote the same elements as before.

In a preferred embodiment, interface card 48 has a plurality of counting registers, which are designated in FIG. 3 as Counter X, Counter Y and Counter Y*. The counting registers Counter Y and Counter Y* each receive the pulse train 30 as an input signal, and they increment their count with each position pulse 32.

Counting register Counter Y is used in order to determine the actual position of the laser 12 along the axis of movement 18. More particularly, counting register Counter Y is read by central processor 38 in order to operate the drive 14 by means of the control algorithm 46. In contrast, counting register Counter Y* is regularly reset to a start value, as has been explained further above with respect to step 66 in FIG. 2. For this purpose, counting register Counter Y* is connected to a set register 86, from which the start value can be written to the counting register Counter Y*, according to step 66 from FIG. 2. A numerical value which represents the start position for the processing of the workpiece 22 is stored in a further register, which in this case is designated Compare Y*.

Reference number 88 designates a comparator in which the counts from the registers Counter Y* and Compare Y* are compared, corresponding to step 72 from FIG. 2. If the counts are the same, comparator 88 produces a signal which in this case is supplied to a signal distributor 90. The signal distributor 90 contains a signal generator 92, which produces the trigger signal 54 for the laser 12.

In the illustrated embodiment, this is a trigger pulse with a pulse width in the region of about 15 µs. In addition, the signal distributor 90 produces a memory trigger (according to step 76 from FIG. 2), which is designated Strobe 1 in FIG. 3. The memory trigger is used to activate memory registers in which current counts of the counting registers are stored.

Furthermore, the signal distributor 90 produces a control signal (in this case designated K3_NIP), by means of which the start value is transferred from set register 86 to counting register Counter Y* (according to step 66 in FIG. 2). Finally, the signal distributor 90 produces an interrupt request signal, which is supplied to the processor 38, thus causing central processor 38 to read the memory register on the interface card 48.

Reference number 56 designates the fault signal which is transferred from the laser 12 to the interface card 48 if the processing of the workpiece 22 was (supposedly) unsuccessful. The signal 56 likewise activates memory registers on the interface card 48 so that that they temporarily store the current count in the counting register Counter Y, thus making it possible to move once again to the position where the fault occurred in a subsequent processing run.

Figure 4:
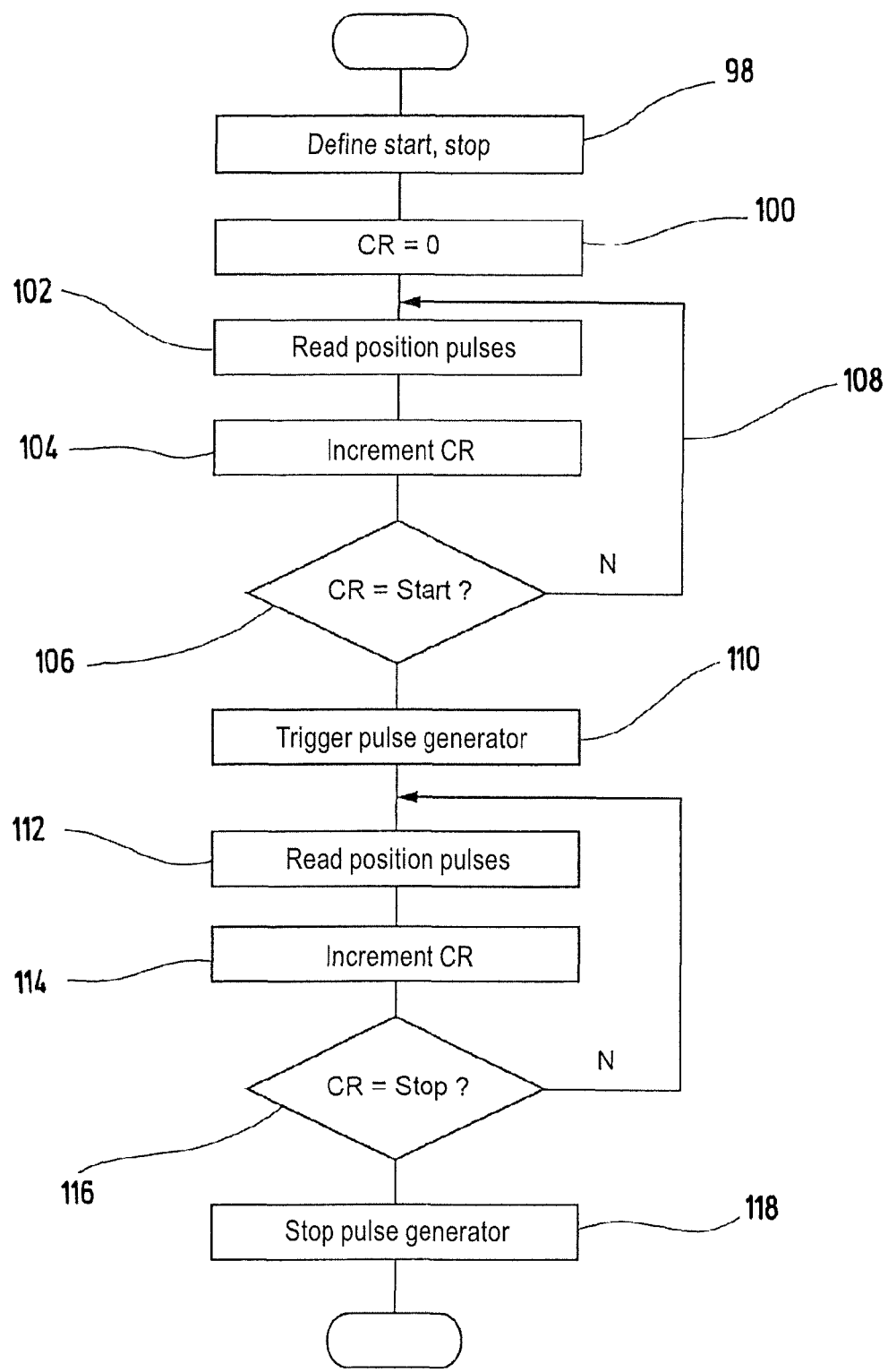
FIG. 4 shows a flowchart in order to explain a second exemplary embodiment.
Figure 5:
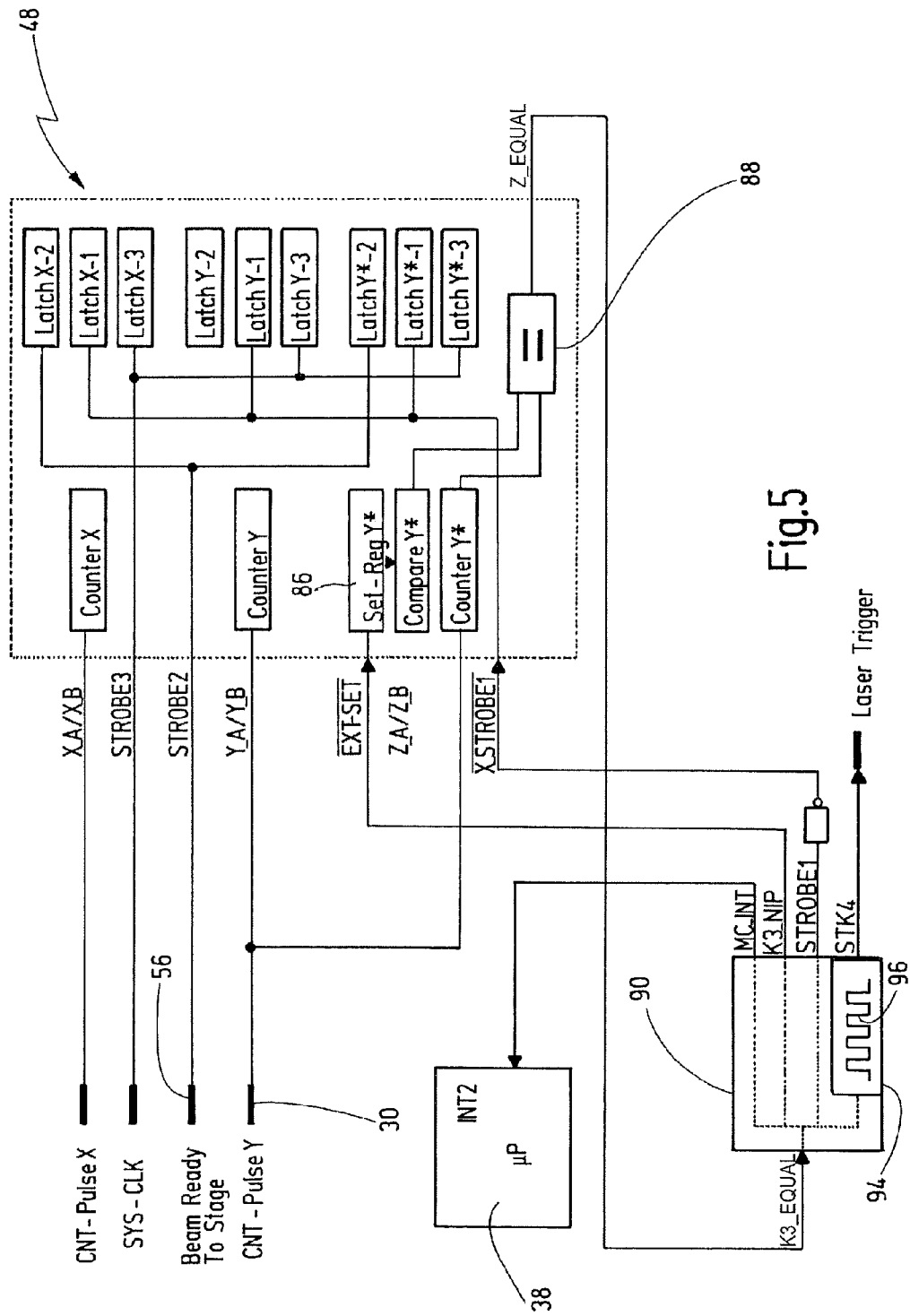
FIG. 5 shows a block diagram in order to explain the second exemplary embodiment.

FIGS. 4 and 5 show a further embodiment, in which the trigger signal 54 for the laser 12 is not produced solely on the basis of the position pulses 32 but, in addition, by means of a pulse generator 94, which produces a plurality of successive "time pulses" 96 (FIG. 5). Apart from this, same reference symbols designate the same elements as before.

According to step 98, the method again starts with the definition of start and stop/end positions, with these positions once again being defined in the form of numbers of position pulses. According to step 100, the counting register Counter Y* is first of all set to zero. Then, according to step 102, 104, the position pulses 32 in the pulse train 30 are read, and the counting register CR (=Counter Y*) is incremented with each position pulse 32.

According to step 106, a check is first carried out in order to determine whether the count in the counting register CR is equal to the start value (in the form of a number of position pulses). Provided that this is not the case, the method remains in the loop 108. The comparison of the counting register CR (Counter Y*) with the start value is again carried out using comparator 88 (FIG. 5). The start value is written from the set register 88 to the comparison register Compare Y* when the signal distributor 90 produces the corresponding transfer signal K3_NIP (in method step 100).

As soon as the counts in the counting register Counter Y* and the comparison register Compare Y* are the same, pulse generator 94 is triggered, according to step 110. This pulse generator 94 produces a pulse train with time pulses 96, which repeatedly trigger the laser 12.

It is self-evident that the laser 12 is moved at as constant a speed as possible along the axis of movement 18 during the production of the time pulse train 96. The drive 14 is preferably accelerated from rest and is operated by means of the drive control system 46 such that it has reached the constant speed on moving over the start position (which corresponds to the selected count in the comparison register Compare Y*).

While the pulse generator 94 is producing the time pulse train 96 in order to trigger the laser 12, according to step 112, 114 the position pulses 32 in the pulse train 30 are still counted, until, according to step 116, the stop or end position for the processing of the workpiece 22 has been reached. The pulse generator 94 is then stopped, according to step 118.

What is claimed is:

1. A method for position-accurate triggering of a machine part which is moved along at least one axis of movement relative to a workpiece and is configured to process the workpiece upon the triggering for processing the workpiece at precisely defined processing positions spaced one from another, the method comprising the steps of:
providing an incremental encoder which generates a first pulse train having a rising number of position pulses as the machine part moves along the axis of movement, the number of position pulses representing a movement position of the machine part,
defining a first number of pulses which represents a desired trigger position for the machine part,
counting the position pulses during movement of the machine part in order to determine a current number of position pulses,
comparing the current number of position pulses and the first number of pulses, and
generating a first trigger signal and supplying said trigger signal to the machine part in order to trigger the machine part when the current number of position pulses corresponds to the first number of pulses,
wherein the machine part is moved by means of a drive control circuit having a control algorithm,
wherein the drive control circuit receives the current number of position pulses in order to determine an actual position of the machine part, wherein the drive control circuit reads the current number of position pulses cyclically with a cycle time that is greater than a time interval between two adjacent position pulses, and wherein the first trigger signal for the machine part is directly generated from the pulse train, bypassing the control algorithm of the drive control circuit.

2. The method of claim 1, wherein the current number of position pulses and the first number of pulses are compared to one another within a time interval that is shorter than a time interval between two adjacent position pulses during movement of the machine part.

3. The method of claim 1, wherein the first trigger signal is repeatedly generated as a function of the current number of position pulses until the machine part has reached a defined end position.

4. The method of claim 1, wherein the first trigger signal starts a pulse generator which produces a second trigger signal having a number of successive time pulses, with the time pulses triggering the machine part.

5. The method of claim 1, wherein the machine part is moved at a constant speed after generation of the first trigger signal.

6. The method of claim 5, wherein the machine part has an optimum operating frequency, with the constant speed being determined as a function of the optimum operating frequency.

7. The method of claim 1, wherein the position pulses are counted using a digital counter which is set to a defined start value whenever the first trigger signal is generated.

8. The method of claim 1, wherein the machine part is configured to carry out an action whenever the trigger signal is generated, with a fault signal being generated if the action does not take place or appears to be unsuccessful.

9. The method of claim 8, wherein the current number of position pulses is stored in a fault memory when the fault signal occurs.

10. An apparatus for position-accurate triggering of a machine part which is configured to process a workpiece and which can be moved along at least one axis of movement relative to the workpiece, in order to allow position-accurate processing of the workpiece at processing positions spaced one from another, the apparatus comprising:

a drive control circuit having a drive for moving the machine part and having a closed loop controller including a control algorithm, an incremental encoder configured to generate a first pulse train having a rising number of position pulses as the machine part moves along the axis of movement, with the number of position pulses representing a movement position of the machine part, a memory for storing a first number of pulses which represents a desired trigger position of the machine part, a counter for counting the position pulses during movement of the machine part in order to determine a current number of position pulses, a comparator for comparing the current number of position pulses and the first number of pulses, and a signal generator for generating a first trigger signal in response to the comparator in order to trigger the machine part when the current number of position pulses corresponds to the first number of pulses, wherein the closed loop controller operates the drive and receives the current number of position pulses as the actual position of the machine part, wherein the drive control circuit reads the current number of position pulses cyclically with a cycle time which is greater than a time interval between two adjacent position pulses, and wherein the first trigger signal for the machine part is directly generated from the pulse train, bypassing the control algorithm of the drive control circuit.

11. The apparatus of claim 10, further comprising a programmable computer unit having an interface card for connecting the incremental encoder, and having a central processor, wherein the closed loop controller is implemented in the form of a controller program which is cyclically run by the central processor, and wherein at least the comparator and the signal generator are arranged on the interface card.

12. The apparatus of claim 10, wherein the machine part comprises a laser configured to be activated as a function of the first trigger signal.

13. A method for position-accurate triggering of a machine part which is configured to be selectively activated by a trigger signal while it is moved along at least one axis of movement relative to a workpiece, in order to allow position-accurate processing of the workpiece at processing positions spaced one from another, the method comprising the steps of:

providing an incremental encoder which generates a first pulse train having a rising number of position pulses as the machine part moves along the axis of movement, the number of position pulses representing a movement position of the machine part, defining a first number of pulses which represents a desired trigger position for the machine part, counting the position pulses during movement of the machine part in order to determine a current number of position pulses, comparing the current number of position pulses with the first number of pulses, and generating a first trigger signal in order to trigger the machine part when the current number of position pulses corresponds to the first number of pulses, wherein the current number of position pulses and the first number of pulses are compared to one another within a time interval that is shorter than a time interval between two adjacent position pulses during movement of the machine part.

14. The method of claim 13, wherein the first trigger signal is repeatedly generated as a function of the current number of position pulses until the machine part has reached a defined end position.

15. The method of claim 13, wherein the first trigger signal starts a pulse generator which produces a second trigger signal having a number of successive time pulses, with the time pulses triggering the machine part.

16. The method of claim 15, wherein the machine part is moved at a constant speed after the generation of the first trigger signal.

17. The method of claim 16, wherein the constant speed is determined as a function of an operating frequency of the machine part.

18. The method of claim 13, wherein the position pulses are counted using a digital counter, which is set to a defined start value whenever the first trigger signal is generated.

19. The method of claim 13, wherein the machine part is configured to carry out an action whenever the trigger signal is generated, with a fault signal being generated if the action does not take place or appears to be unsuccessful, and with the current number of position pulses being stored in a fault memory when the fault signal occurs.

* * * * *